A. I. SANDBO.
ANTISKID DEVICE.
APPLICATION FILED APR. 30, 1920.
1,399,658.
Patented Dec. 6, 1921.
2 SHEETS—SHEET 2.
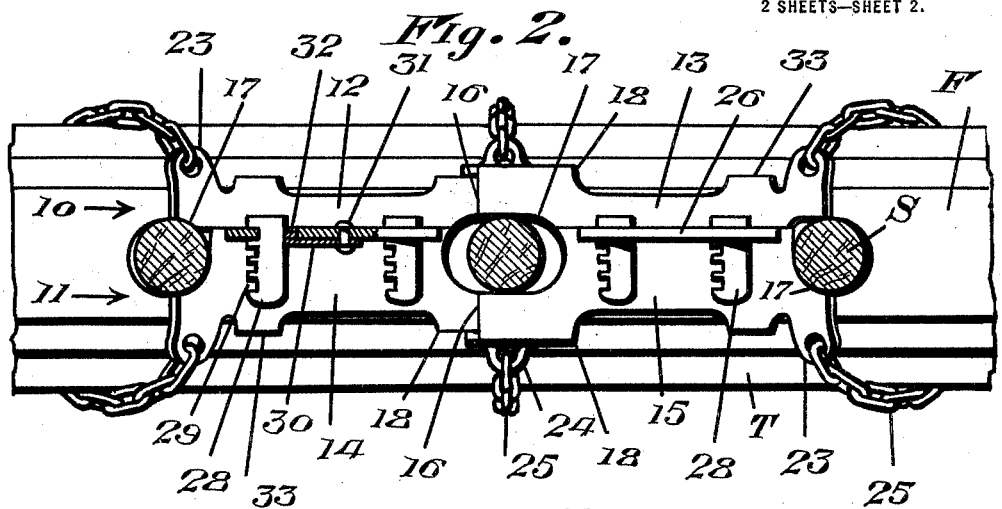
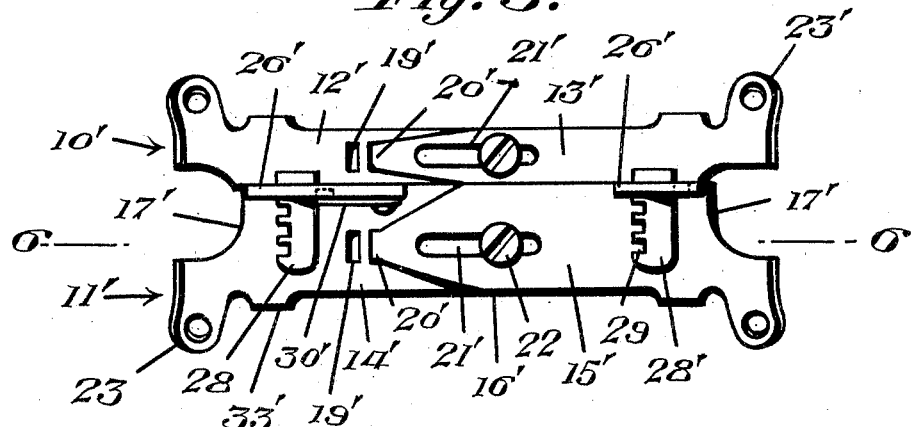
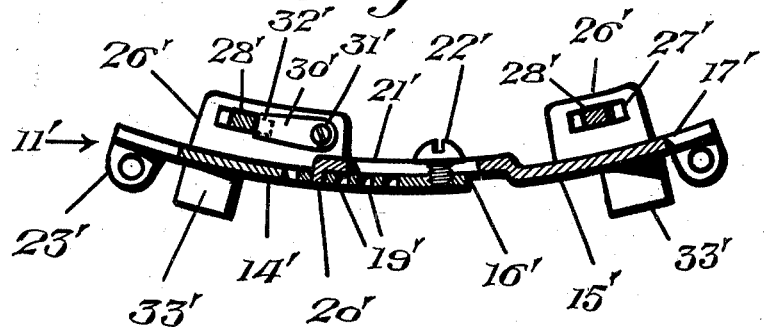
Inventor
A. I. SANDBO
By W. J. FitzGerald
Attorney

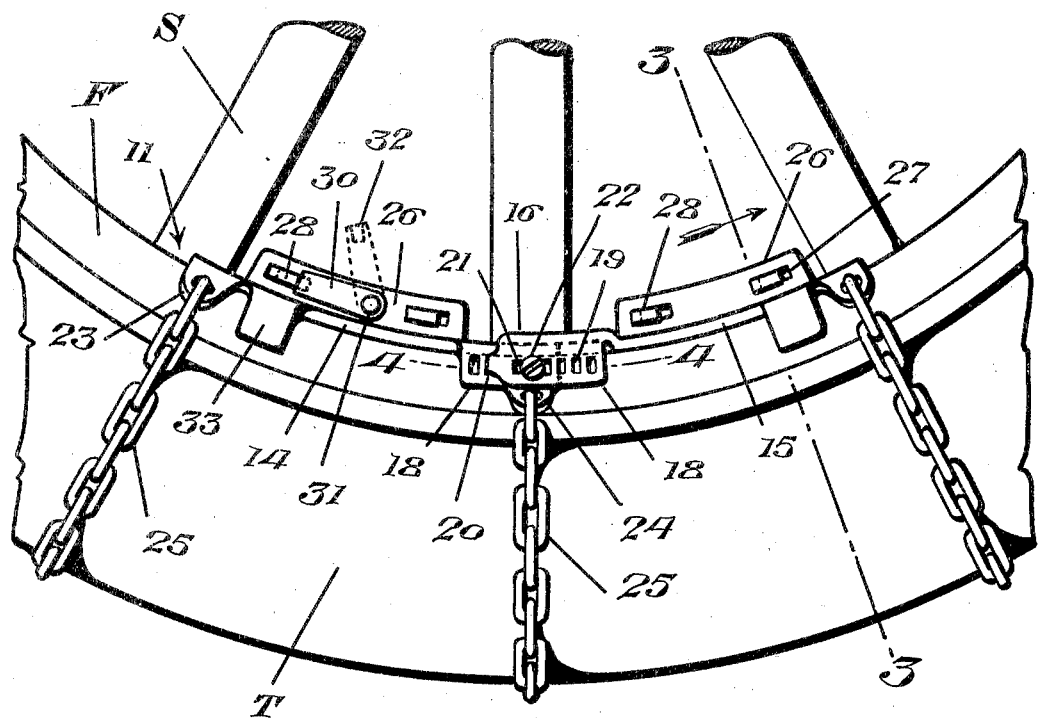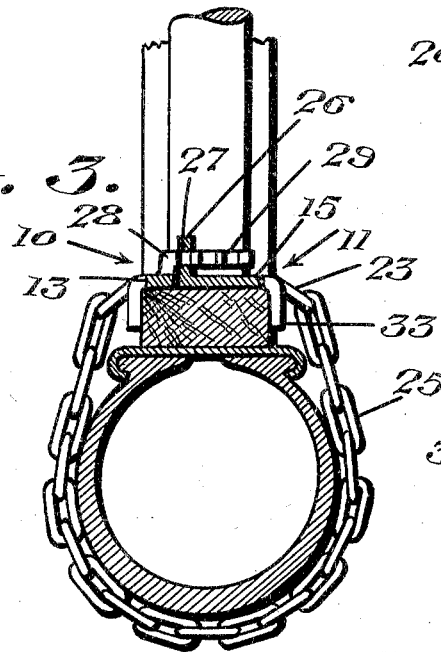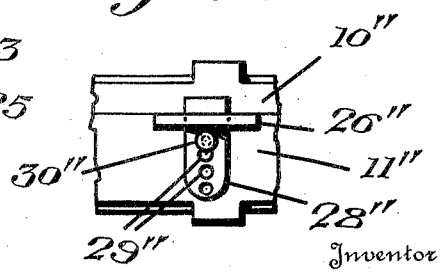

UNITED STATES PATENT OFFICE.

ANTON I. SANDBO, OF ROCK ISLAND, ILLINOIS, ASSIGNOR TO BEAR MANUFACTURING COMPANY, OF ROCK ISLAND, ILLINOIS, A CORPORATION OF DELAWARE.

ANTISKID DEVICE.

1,399,658.   Specification of Letters Patent.   Patented Dec. 6, 1921.

Application filed April 30, 1920. Serial No. 377,804.

*To all whom it may concern:*

Be it known that I, ANTON I. SANDBO, a citizen of the United States, residing at Rock Island, in the county of Rock Island and State of Illinois, have invented certain new and useful Improvements in Antiskid Devices; and I do hereby declare the following to be a full, clear, and exact description of the invention, such as will enable others skilled in the art to which it appertains to make and use the same.

This invention relates to anti-skid devices and chains for automobile and other vehicle wheels, and has for its object the provision of novel and improved means for attaching or anchoring to the wheel, cross chains or traction members which extend across the tread of the tire to prevent slipping and to facilitate traction.

Another object is the provision of such a device including a felly and spoke-engaging clamp comprising opposite side sections to which the opposite terminals of the traction chains or members are connected, and provided with novel means for the connection of said sections when said chains or members are applied around the tire and the sections brought together at the inner periphery of the felly, in order to securely fasten the device to the wheel.

A further object is the provision of such a device which is adjustable for application to various wheels, in which the outer ends of the spokes are spaced apart different distances where they connect with the felly, in order that the device can be readily adjusted to accommodate the particular wheel on which it is used.

A still further object is the provision of such a device of novel and improved construction for fitting and clamping the felly and engaging the spokes, whereby to maintain itself in place against accidental detachment or loosening and which device can be readily applied to the wheel without the necessity of jacking up the wheel or running same over the device, as necessary with the usual anti-skid chain which extends completely around the tire.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:

Figure 1 is a side elevation of the device as applied, showing the latch in releasing position in dotted lines.

Fig. 2 is a view of the device looking from the inside of the wheel.

Fig. 3 is a cross section of the device taken on the line 3—3 of Fig. 1.

Fig. 4 is an enlarged sectional detail taken on the line 4—4 of Fig. 1.

Fig. 5 is an inside plan view of a modified form of clamp.

Fig. 6 is a section on the line 6—6 of Fig. 5.

Fig. 7 is a fragmentary detail view showing a further modification.

The present device embodies an arcuate clamp to fit the inner periphery of the felly F, and to engage some of the spokes S whereby said clamp in engaging the felly and spokes will maintain itself in place securely. As shown in Figs. 1 to 4, inclusive, this clamp is divided longitudinally, and has the opposite longitudinal side sections 10 and 11. The side section 10 comprises the two arcuate parts 12 and 13, and, similarly, the section 11 comprises the two arcuate parts 14 and 15, such parts being stamped from sheet metal or otherwise formed, and having their adjacent ends overlapping, as at 16, for adjusting the side sections 10 and 11 longitudinally. The ends of the parts 12, 13, 14 and 15 are formed with notches or recesses 17 to receive and accommodate the spokes, as clearly seen in Fig. 2.

Each side section of the clamp is adjustable longitudinally and for this purpose the overlapping terminals of the two parts thereof are provided at those edges opposite the other sections, with flanges 18 extending at an angle away from the center of the wheel to overlap one another and to also overlap the corresponding side of the felly. These flanges 18 of the two sections overlap one another at the opposite sides of the felly, and bear against said sides of the felly when the two sections are brought together. Each flange 18 has a longitudinal series of apertures 19, and the companion flange 18 is provided at one end with a lug 20 to enter said notches or apertures, so that the apertures and lugs of the flanges of each pair interengage mutually, as seen in Fig. 4. This provides for the relative adjustment of the parts of each section of the clamp by separating said parts and shifting them longitudinally relatively to one another to the desired adjustment, and moving the flanges 18 together so that the lugs 20 enter the respective apertures 19 to hold the parts in adjustment. The flanges 18 of each pair are clamped together. Thus, the outmost flange 18 has a longitudinal slot 21 through which a screw 22 passes and said screw is threaded into the innermost flange whereby to clamp said flanges together. The screw when loosened enables the flanges to be separated for purpose of adjustment, and the slot 21 permits of the longitudinal adjustment of the parts. The parts of each section of the clamp are thus adjusted longitudinally to correspond with the spacing of the outer ends of the spokes adjacent to the felly, and when this adjustment has once been made, the device can be applied to and removed from the wheel without further adjustment. This enables the device to be applied to various wheels, wherein the outer ends of the spokes are spaced different distances apart.

The parts of the sections 10 and 11 are provided at their opposite ends and opposite edges with apertured ears 23, and one flange 18 of each pair is also provided with a similar apertured ear 24, and the traction chains or members 25 which extend around the tire and across the tread thereof, having their terminals engaged with the ears 23, thus connecting said chains or members at their terminals to the opposite clamp sections 10 and 11.

In order to connect the sections of the clamp when they are brought together at the inner periphery of the felly, the parts 14 and 15 are provided at those edges adjacent to the section 10 with flanges 26 extending at an angle toward the center of the wheel, and provided with slots 27. The parts 12 and 13 of the clamp section 10 have inwardly offset tongues 28 projecting toward the section 10 and movable through the slots 27 when the sections are moved together. One edge of each tongue 28 has a series of notches 29, so that when the tongues of the section 10 are inserted through the flanges 26, and the two sections 10 and 11 shifted longitudinally slightly, this will engage the flanges 26 in the corresponding notches 29, thereby holding the two sections 10 and 11 together against separation. The series of notches 29 provide for lateral adjustment to accommodate wheel fellies of different widths, as will be readily understood. A spring latch 30 is pivoted, as at 31, to one flange 26 and can be swung behind one of the tongues 28, as seen in Fig. 2, to hold the tongues in engagement with the flanges. The latch 30 has a lug 32 to spring into the corresponding slot 27 to prevent the latch from swinging out of locking position. This will prevent the unlocking of the two sections of the clamp, although said latch can be readily sprung manually out of engagement with the slot and tongue and then swung to releasing position, as seen in dotted lines in Fig. 1. Then, by shifting the sections of the clamp longitudinally relatively to one another, the notches 29 and flanges 26 are disengaged, and the sections can be readily separated, thereby withdrawing the tongues 28 from the slots 27. It is thus an easy matter to apply the device by passing the two sections of the clamp across the opposite sides of the tire bringing the chains or members 25 across the tread of the tire and the sections are then moved together at the inner periphery of the felly, and when shifted longitudinally will be locked together. The latch 30 is then manipulated to prevent accidental disconnection. The central notches or recesses 17 accommodate the intermediate spoke, while the end notches or recesses snugly receive the other spokes, as seen in Fig. 2, thereby snugly holding the clamp in place. Furthermore, the opposite edges of the parts of the clamp have ears 33 extending at an angle to overlap and bear against the opposite sides of the felly to assist in securely holding the device in place. Thus, the two sections of the clamp are moved together laterally to fit and engage the felly, and to also engage the spokes with the parts of said sections located between three spokes, and the connecting means of the sections are also located between said spokes.

Figs. 5 and 6 illustrate a modification, wherein the clamp is designed for use between a pair of spokes. The clamp comprises the two side sections 10′ and 11′, composed of the respective arcuate parts 12′—13′, and 14′—15′ having their adjacent end portions overlapping, as at 16′. The opposite ends of the parts have the notches or recesses 17′ to receive and fit the two spokes. Longitudinal adjustment of the section is obtained by a longitudinal series of apertures or notches 19′ in the parts 12′ and 14′, and the adjacent ends of the parts 13′ and 15′, repectively, have lugs 20′ to engage in the apertures for maintaining the adjustments. The parts 13′ and 15′ have longitudinal slots 21′ through which screws 22′ extend, and said screws are threaded into the parts 12′ and 14′ for clamping the parts of the sections together. This adjustment is similar to the adjustment between the flanges 18 above described. The parts have the apertured ears 23′ for the connection of the traction chains or members, and the parts 14′ and 15' have the flanges 26' with slots 27' through which the tongues 28' of the parts 12' and 13' move when the two sections are brought together. The tongues 28' have notches 29' to move into engagement with the flanges 26' to hold the sections together and a spring latch 30' is also used being pivoted, as at 31' to one flange 26' to engage the corresponding tongue 28' and said latch has a lug 32' to snap into the corresponding slot 27' similar to the latch 30 hereinbefore described.

This device is applied in practically the same manner as the device shown in Figs. 1, 2 and 3, and is somewhat more simple in construction in that it is only used between a pair of spokes, instead of engaging three spokes.

A further modification is shown in Fig. 7. Thus, the tongue 28" of the section 10" which passes through the flange 26" of the section 11" has a series of apertures 29" instead of the notches and a key or pin 30" is inserted in one of said apertures, to hold the sections together, instead of using the notches and latch as hereinbefore described. With this arrangement, the sections are not shifted longitudinally relatively to one another into engagement, but are simply moved together transversely and the key or pin 30" inserted into the proper aperture of each tongue.

Having thus described the invention, what is claimed as new is:—

1. An anti-skid device comprising a clamp having longitudinal side sections adapted to be moved together from opposite sides to fit the inner periphery of a wheel felly and having portions at their opposite edges to bear against the opposite sides of the felly, said sections having portions at their adjacent edges to receive spokes of the wheel, the sections having means at those sides opposite to the felly adapted to slip together for attaching said sections together, means coöperable with said means to hold same against lateral separation, and traction means connected to said sections to extend across the tire.

2. An anti-skid device comprising a clamp having longitudinal side sections adapted to be moved together laterally from opposite sides to fit the inner periphery of a wheel felly and having portions at their opposite edges to bear against the opposite sides of said felly, said sections having portions at their adjacent edges to accommodate spokes of the wheel, traction means connected to said sections to extend across the tire, the adjacent edges of said sections having portions at that side opposite to the felly adapted to slip together for adjustably connecting said sections to clamp them to wheel fellies of different widths, and means to prevent lateral separation of the last named portions.

3. An anti-skid device comprising a clamp to fit the inner periphery of a wheel felly, composed of longitudinal side sections having portions to fit the felly and spokes, tractions means connected to said sections to extend across the tire, an adjustable connection between the sections including a slotted flange carried by one section and a tongue carried by the other section to pass through said flange, and means for preventing the withdrawal of said tongue from the flange.

4. An anti-skid device comprising a clamp to fit the felly of a wheel and including adjustably-connected parts having ends arranged adjacent to one another between the ends of the clamp and other ends located opposite to one another at the ends of the clamp, said parts having portions at their opposite ends for receiving spokes of a wheel and said parts also having portions at their adjacent ends for receiving a spoke intermediate the opposite ends of the clamp, and traction means connected to the clamp to extend across the tire.

5. An anti-skid device comprising a clamp to fit a wheel felly having parts with adjacent terminals overlapping one another between the ends of the clamp and provided with means for adjustably connecting them, and having other terminals located opposite to one another at the ends of the clamp, the opposite terminals of said parts having portions to receive spokes of the wheel, and the adjacent terminals of said parts also having portions for receiving a spoke intermediate the opposite ends of the clamp, and traction means connected to the clamp to extend around the tire.

6. An anti-skid device comprising a clamp to fit a wheel felly having parts with overlapping adjacent end portions, means connecting said portions for clamping them together, one of said portions having apertures and the other having a lug to engage in the apertures in different longitudinal adjustments of said parts, the opposite ends of said parts having means for accommodating spokes of the wheel, and traction means connected to the clamp to extend across the tire.

7. An anti-skid device comprising a clamp composed of two longitudinal side sections, each section having adjustably connected parts with portions for receiving spokes of a wheel so that each section can be adjusted according to the spacing of the spokes, each section being independently adjustable and having means for maintaining the adjustment, traction means connected to said sections, and means for connecting said sections.

8. An anti-skid device comprising a clamp to fit a wheel felly composed of two longitudinal side sections, each section having two parts with overlapping adjacent end portions, means adjustably connecting said portions for the relative longitudinal adjustment of said parts, the opposite ends of said parts having portions to engage spokes of the wheel, traction means connected to said sections to extend across the tire, means carried by said sections to move into engagement when said sections are moved toward one another, for adjustably connecting said sections, to accommodate fellies of different widths, said sections having means to overlap opposite sides of the felly, and means for preventing disconnection of said sections in various adjustments when moved together.

9. An anti-skid device comprising a clamp having longitudinal side sections adapted to move together laterally from opposite sides at the inner periphery of a wheel felly and having fixed portions to slide together one in the other, and portions for accommodating spokes of the wheel, traction means connected to said sections to extend across the tire, and means for preventing the separation of the first named portions to hold the sections together on the wheel.

10. An anti-skid device comprising a clamp having longitudinal side sections adapted to move together laterally from opposite sides at the inner periphery of a wheel and having portions for accommodating spokes of the wheel, traction means connected to said sections to extend across the tire, said sections having portions to fit together slidably when the sections are moved together and providing for the spacing of the sections different distances apart for fellies of different widths, and means coöperable with the last named portion for preventing separation of the sections.

11. An anti-skid device comprising a clamp having longitudinal side sections adapted to move laterally together from opposite sides at the inner periphery of a wheel felly, traction means connected to said sections to extend across a tire, said sections having portions to move together by the lateral movement of the sections toward one another and to interengage by a relative longitudinal movement of the sections, and means for retaining said portions in engagement.

12. An anti-skid device comprising a clamp to fit the inner periphery of a wheel felly composed of longitudinal side sections having portions to fit the felly and spokes, traction means connected to said sections to extend across the tire, an adjustable connection between the sections including a slotted flange carried by one section and a tongue carried by the other section to pass through said flange and having notches to engage the flange by a relative longitudinal movement of said sections, and means for holding said tongue and flange in engagement.

13. An anti-skid device comprising a clamp composed of adjustably-connected members having portions for receiving spokes of a wheel, said members being adjustable relatively for spacing said portions according to the spacing of the spokes, said members also being adjustable transversely so that the clamp can fit fellies of different widths, and traction means connected to said clamp to extend across the tire.

14. An anti-skid device comprising a clamp composed of longitudinal side sections to be moved laterally together at the inner periphery of a wheel felly having portions to receive spokes of the wheel, traction means connected to said sections to extend across the tire, each of said sections being adjustable longitudinally for spacing said portions according to the spacing of the spokes, and means for connecting said sections to prevent separation thereof when applied to the felly and spokes.

15. An anti-skid device comprising a clamp composed of adjustably-connected members having portions for receiving spokes of a wheel, said members being adjustable relatively for spacing said portions according to the spacing of the spokes and having means for maintaining such adjustment, said members also being adjustable transversely so that the clamp can fit fellies of different widths and having means for maintaining such adjustment independent of the first named adjustment, and traction means connected to said clamp to extend across the tire.

16. An anti-skid device comprising a clamp composed of longitudinal side sections to be moved laterally together at the inner periphery of a wheel felly having portions to receive spokes of the wheel, traction means connected to said sections to extend across the tire, each of said sections being adjustable longitudinally for spacing said portions according to the spacing of the spokes and having means for maintaining such adjustment, and means for connecting said sections in their different adjustments and for preventing separation thereof when applied to the felly and spokes.

In testimony whereof I have signed my name to this specification in the presence of two subscribing witnesses.

ANTON I. SANDBO.

Witnesses:
 ELLEN J. SWANSON,
 MABLE SWANSON.